No. 892,729. PATENTED JULY 7, 1908.
N. ILLOWAY.
COLLAR SUPPORTER.
APPLICATION FILED NOV. 12, 1907.
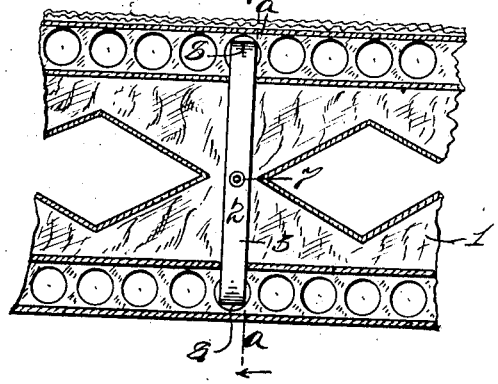
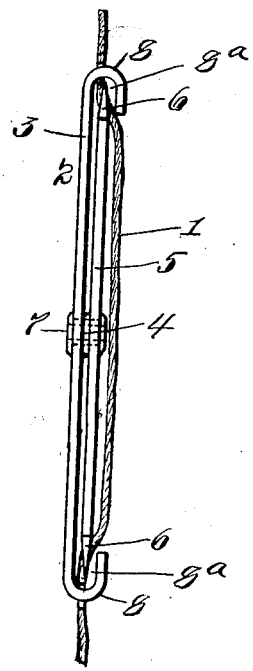
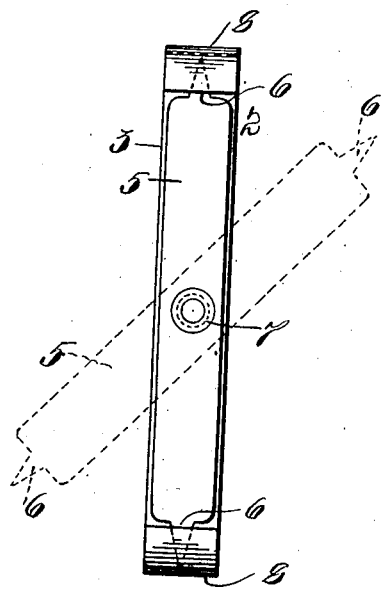

UNITED STATES PATENT OFFICE.

NETTIE ILLOWAY, OF NEW YORK, N. Y.

COLLAR-SUPPORTER.

No. 892,729.  Specification of Letters Patent.  Patented July 7, 1908.

Application filed November 12, 1907. Serial No. 401,807.

*To all whom it may concern:*

Be it known that I, NETTIE ILLOWAY, a citizen of the United States, residing at New York city, Manhattan borough, county and State of New York, have invented certain new and useful Improvements in Collar-Supporters, of which the following is a clear, full, and exact description.

This invention relates to collar-supporting devices, the object being to provide a cheap and efficient supporter which can be applied to and support or keep distended collars of the open-work or lace variety.

To these and other ends which will hereinafter appear, my invention comprises the novel features of improvement and combination and arrangement of parts which I will now proceed to describe and finally claim, reference being had to the accompanying drawing, forming part hereof, wherein—

Figure 1 is an outside view of a portion of an open-work collar having my improved supporter applied thereto; Fig. 2 is an enlarged vertical sectional view thereof, the section being taken on line $a-a$ in Fig. 1 and looking in the direction of the arrow; and Fig. 3 is an enlarged detail rear view of my supporter.

Referring to the drawing, the numeral 1 indicates an open-work collar. Said collar 1 is to be considered diagrammatically as representing a collar which is made of any flexible material, such as lace, insertion or the like. As collars of this class are largely used by ladies, and as such collars are very liable to wrinkle, or curl over, I have provided a supporting element, such as 2 (Fig. 1), which can be applied to the collar, preferably on the outside. The supporter 2 may be studded with jewels or suitably ornamented, and may be made of any light material; but I prefer to make the same of celluloid, which can be easily colored.

The supporter 2 comprises a base-member 3 (Fig. 2) having pivotally attached thereto, as at 4, a bar or plate 5, said bar being provided at the ends thereof with gripping-points 6, preferably formed integral with the bar 5. The means for pivotally connecting the bar 5 and the base 3 is, in this instance, an eyelet 7. The parts 3 and 5 will be bound together, by the said eyelet, hard enough to produce sufficient friction to require a little pressure to move the said bar 5. Each end of the base 3 is turned over, as at 8, to form a protector or pocket $8^a$ for the point 6.

To apply the supporter to a collar, as many supporters can be used as desired, and the bar 5 of each supporter is moved outwardly as shown by dotted lines in Fig. 3. The ends 8 of the base 3 are (for instance) passed through openings in the lace-collar, as shown in Fig. 1, and the bar 5 returned to its normal position, the points 6 being caused to grip the lace, as shown in Fig. 2, or to pass through an opening in the lace, as the case may be. By this means a lace or open-work collar is prevented from sagging or wrinkling, as said bar 5 will draw the collar slightly when said bar is returned to its closed position. The pockets $8^a$ prevent the points 6 from coming in contact with the neck, as the said points pass under the turned over ends of the base 3.

Having now described my invention, what I claim and desire to secure by Letters Patent is:

1. A collar-supporter, comprising a base-member having turned over ends, whereby pockets are provided, and a gripping member provided with points pivotally attached intermediate the ends thereof to said base member, the points of said gripping-member being adapted to enter the pockets at the ends of said base-member.

2. A collar-supporter, comprising a base-member, having turned over ends, whereby a pocket is provided at each end, and a gripping-member pivotally attached intermediate the ends thereof to said base-member, the extremities of said gripping-member being adapted to be radially moved into the pockets at the ends of said base-member.

Signed at N. Y. city this 8 day of November, 1907.

NETTIE ILLOWAY.

Witnesses:
EDWARD A. JARVIS,
ABRAM SHLIVEK.